US006434116B1

(12) United States Patent
Ott

(10) Patent No.: US 6,434,116 B1
(45) Date of Patent: Aug. 13, 2002

(54) METHOD AND SYSTEM FOR STABILIZED RANDOM EARLY DETECTION USING CONNECTION SAMPLING

(75) Inventor: Teunis J. Ott, Chester, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/187,576

(22) Filed: Nov. 5, 1998

Related U.S. Application Data

(60) Provisional application No. 60/064,895, filed on Nov. 7, 1997.

(51) Int. Cl.[7] .............................................. H04L 12/26
(52) U.S. Cl. ....................... 370/235; 370/230; 370/352; 370/412
(58) Field of Search ................................ 370/232, 233, 370/234, 235, 352, 389, 392, 400, 412, 229, 230, 231

(56) References Cited

U.S. PATENT DOCUMENTS 5,430,709 A * 7/1995 Galloway ..................... 370/13
6,201,793 B1 * 3/2001 Chen et al. ................. 370/238

FOREIGN PATENT DOCUMENTS

WO     WO 00/52882     * 9/2000

OTHER PUBLICATIONS

S. Floyd and V. Jacobson, Random Early Detection Gateways for Congestion Avoidance, IEEE/ACM Transactions of Networking, vol. 1, No. 4, pp. 397–413, Aug. 1993.

* cited by examiner

Primary Examiner—Hassan Kizou
Assistant Examiner—Tim Spafford
(74) Attorney, Agent, or Firm—Joseph Giordano

(57) ABSTRACT

Methods and systems for determining the number of active connections in a node in a communications network are described. The node determines the number of active connections by sampling a list of recently active connections in the node when the node receives a packet, and estimating the number of active connections based on whether the packet is associated with a sampled entry in the list. Each entry in the list includes a connection identifier and a count. The node stabilizes the buffer occupancy by estimating the number of active connections in the node based on a sampling of the list of recently active connections when the node receives a packet, determining a probability for discarding the packet based on the estimated number of active connections and the recent buffer occupancy, and discarding the packet according to the determined probability. Finally, the node monitors the connection associated with the received packet when the connection is associated with the connection identifier in a sampled entry, the count of the sampled entry exceeds a first predetermined threshold, and/or a total occurrences of the connection identifier in the list exceeds a second predetermined threshold.

14 Claims, 4 Drawing Sheets

METHOD AND SYSTEM FOR STABILIZED RANDOM EARLY DETECTION USING CONNECTION SAMPLING

CROSS-REFERENCE TO RELATED APPLICATIONS

This application relates to U.S. Provisional Application No. 60/064,895, filed Nov. 7, 1997 and U.S. patent application Ser. No. 09/186,241, filed simultaneously with this application and entitled "Method And System For Stabilized Random Early Detection Using Packet Sampling."

BACKGROUND OF THE INVENTION

The present invention generally relates to congestion control in communication networks, and more particularly, to a method and system for buffer management in communication networks.

Communication networks transport information in the form of packets, frames, and/or cells from source nodes to destination nodes over transmission links. The Internet, for example, uses routers for routing packets to their respective destination nodes. Routers typically have buffers at their input and output ports for buffering the packets during the periods when the number of packets in the routers exceeds the bandwidth capacity at the output ports.

The Internet uses a variety of protocols for transporting packets including congestion control and error recovery. One widely used protocol is the Transmission Control Protocol (TCP), which uses a dynamic window based congestion control method. In the TCP congestion control method, the source and destination nodes are the only active participants in controlling traffic congestion in the network. A source node using the TCP congestion control method uses information about packet losses as congestion indicators. The TCP congestion control method is different from other congestion control techniques, for example DECBIT, where the network actively participates in controlling congestion by setting congestion indicator bits in packets when the network detects congestion.

A node, for example a router or a switch, which uses a TCP unaware buffer management scheme, simply discards arriving packets when its buffer is full. Unless the node buffer has a large capacity, such buffer management schemes generally reduce the network throughput. Also, the network allocates less bandwidth to connections that have long round-trip times than to connections with short round-trip times.

S. Floyd and V. Jacobson, "Random Early Detection Gateways For Congestion Avoidance," IEEE/ACM Transactions of Networking, vol. 1, no. 4, pp. 397–413, August 1993, describes a Random Early Detection (RED) technique, which uses a TCP aware buffer management scheme. With the RED technique, when the average buffer content is beyond a predetermined threshold, a node r packets according to a probability, which is based on the recent behavior of the buffer content. When a node discards a packet, the source node eventually detects this packet loss, infers that the network is congested, and decreases its transmission window (also referred to as congestion window). Hence, by decreasing the size of its congestion window and thus reducing the number of outstanding packets in the network, the source node reduces the buffer occupancy of nodes in the network.

One of the problems associated with the RED technique is that the impact of discarding a packet strongly depends on the window size of the TCP connection associated with the source node. Generally, when the source node detects a packet loss, it decreases its congestion window size by one-half and then under most circumstances, as long as the source node does not detect any more packet losses, it increases its congestion window by one Maximum Segment Size (MSS), for example one packet, once every one or two round-trip times.

For example, when a discarded packet belongs to a connection with a congestion window of, for example, 6 MSSs, the congestion window decreases by 3 MSSs to 3 MSSs, and after 3 to 6 round-trip times, the congestion window is back to its original size of 6 MSSs. On the other hand, when a discarded packet belongs to a connection with a congestion window of 1000 MSSs, the congestion window decreases by 500 MSSs to 500 MSSs, and it takes 500 to 1000 round-trip times before the congestion window is back to its original size of 1000 MSSs.

Therefore, to enhance the network throughput, a node would need to know whether a specific high buffer content is caused by a few connections with large congestion windows or by a large number of connections with small congestion windows. The former requires a small packet discard rate, whereas the latter requires a high packet discard rate.

One known solution is to maintain at each node a list of the currently active connections that are supported by the node. This solution requires per connection state information, which would be impractical when the number of connections is large or when it is desired to keep the cost of the node low while providing tolerable network performance.

Another solution, which is disclosed in a pending U.S. patent application Ser. No. 09/186,241, entitled "Method And System For Stabilized Random Early Detection Using Packet Sampling" and filed concurrently with the present application, estimates the number of active connections in each node without maintaining state information on each connection. Each node samples one or more packets in its buffer when the node receives a packet. The node then determines the number of sampled packets that are associated with the same connection as the received first packet, and estimates the number of active connections in the node based on the determined number of sampled packets. This solution, however, has a disadvantage that a node cannot compare arriving packets that are more than one buffer drain time apart.

DESCRIPTION OF THE INVENTION

Methods and systems consistent with the present invention determine the number of active connections in a node in a communications network by sampling a list of recently active connections in the node when the node receives a packet, and estimating the number of active connections based on whether the packet is associated with a sampled entry in the list, where each entry comprises a connection identifier and a count. Such methods and systems also identify a connection associated with the received packet, increment the count of the sampled entry when the identified connection is associated with the connection identifier of the sampled entry, and based on a predetermined probability, modify the sampled entry to correspond to the identified connection when the identified connection is not associated with the connection identifier.

Furthermore, the methods and systems stabilize the buffer occupancy of the node by estimating the number of active connections in the node based on a sampling of a list of recently active connections in the node when the node receives a packet, determining a probability for discarding the packet based on the estimated number of active connections and the recent buffer occupancy, and discarding the packet according to the determined probability. The buffer occupancy may be expressed in terms of, for example, the fraction of the buffer space that is occupied by packets.

Finally, such methods and systems monitor the identified connection when the identified connection is associated with the connection identifier, the count exceeds a first predetermined threshold, and/or a total occurrences of the connection identifier in the list exceeds a second predetermined threshold.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

A node in a communications network samples a list of recently active connections maintained at the node when the node receives a packet. The node then estimates the number of active connections based on whether the received packet is associated with a sampled entry in the list, where each entry comprises a connection identifier and a count. Specifically, the node identifies the connection associated with the received packet, and increments the count of the sampled entry when the identified connection is associated with the connection identifier in the sampled entry. When the identified connection is not associated with the connection identifier, the node, based on a probability $P_{entry}$, modifies the sampled entry to correspond to the identified connection and resets the count of the sampled entry.

Furthermore, the node stabilizes the number of packets in its buffer as follows: The node estimates the number of active connections based on a sampling of the list of recently active connections when the node receives a packet. The node then determines a probability $P_{discard}$ for discarding the packet based on the estimated number of active connections and the recent buffer occupancy, and discards the packet according to the determined probability. The buffer occupancy may be expressed in terms of, for example, the fraction of the buffer space that is occupied by packets.

Finally, the node monitors the connection associated with the packet when the connection corresponds to the connection identifier of a sampled entry, the count of the sampled entry exceeds a first predetermined threshold, and/or a total occurrences of the connection identifier in the list exceeds a second predetermined threshold.

Figure 1:
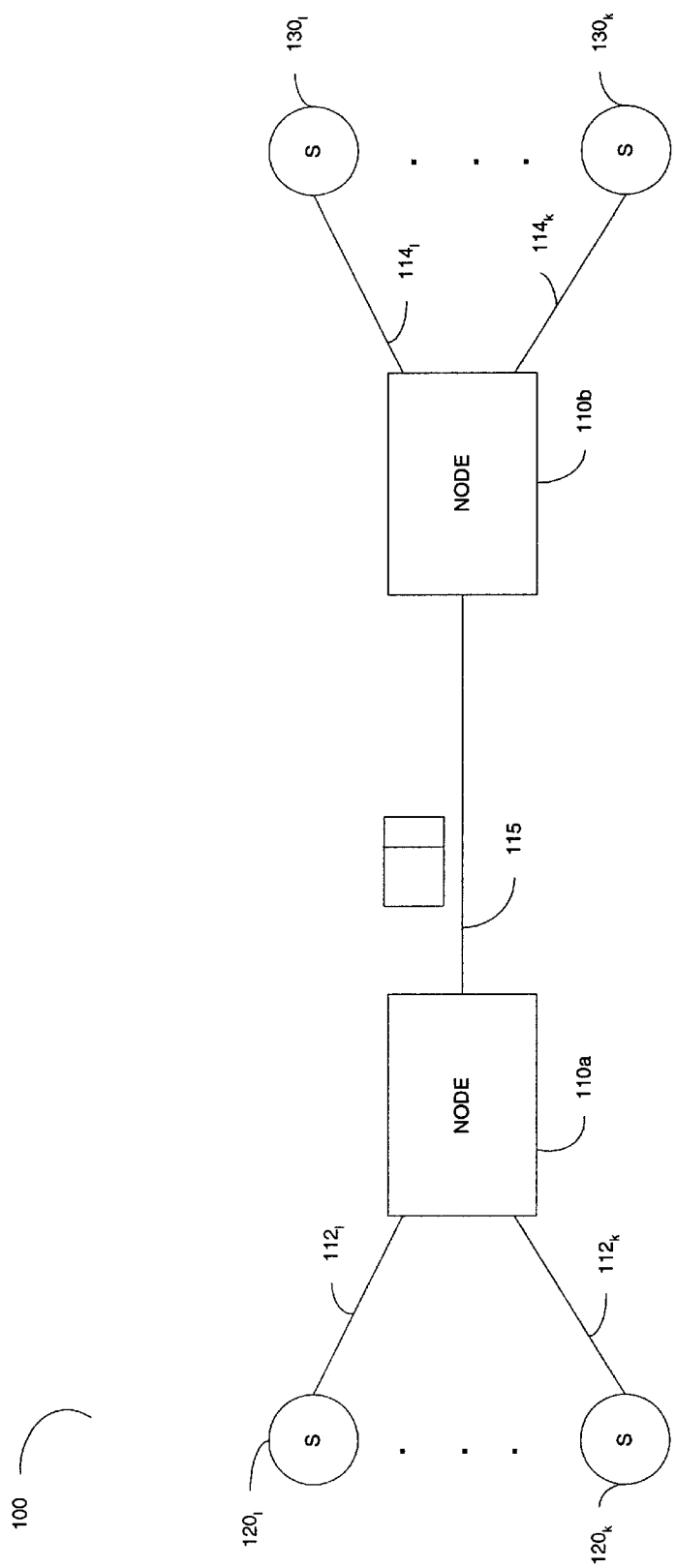
FIG. 1 is a block diagram of a communications network in accordance with an embodiment of the invention.

FIG. 1 is a block diagram of a communications network 100 in accordance with an embodiment of the invention. Communications network 100 comprises nodes 110a and 110b, transmission link 115, sources $120_l$ through $120_k$, and sources $130_l$ through $130_k$. Network 100 may be any type of packet-switched network including, for example, the Internet, a frame relay network, or an Asynchronous Transfer Mode (ATM) network. Nodes 110a and 110b each may include, for example, a router, bridge, or a switching system.

Sources $120_l$–$120_k$ interface to node 110a via links $112^1$–$112_k$, respectively. Sources $130_l$–$130_k$ interface to node 110b via links $114_l$–$114^k$, respectively. Sources $120_l$–$120_k$ and $130_l$–$130_k$ may include any equipment capable of transmitting and receiving packetized information in form of voice, data, and/or video. Packetized information herein broadly may include packets, frames, and or cells.

Figure 2:
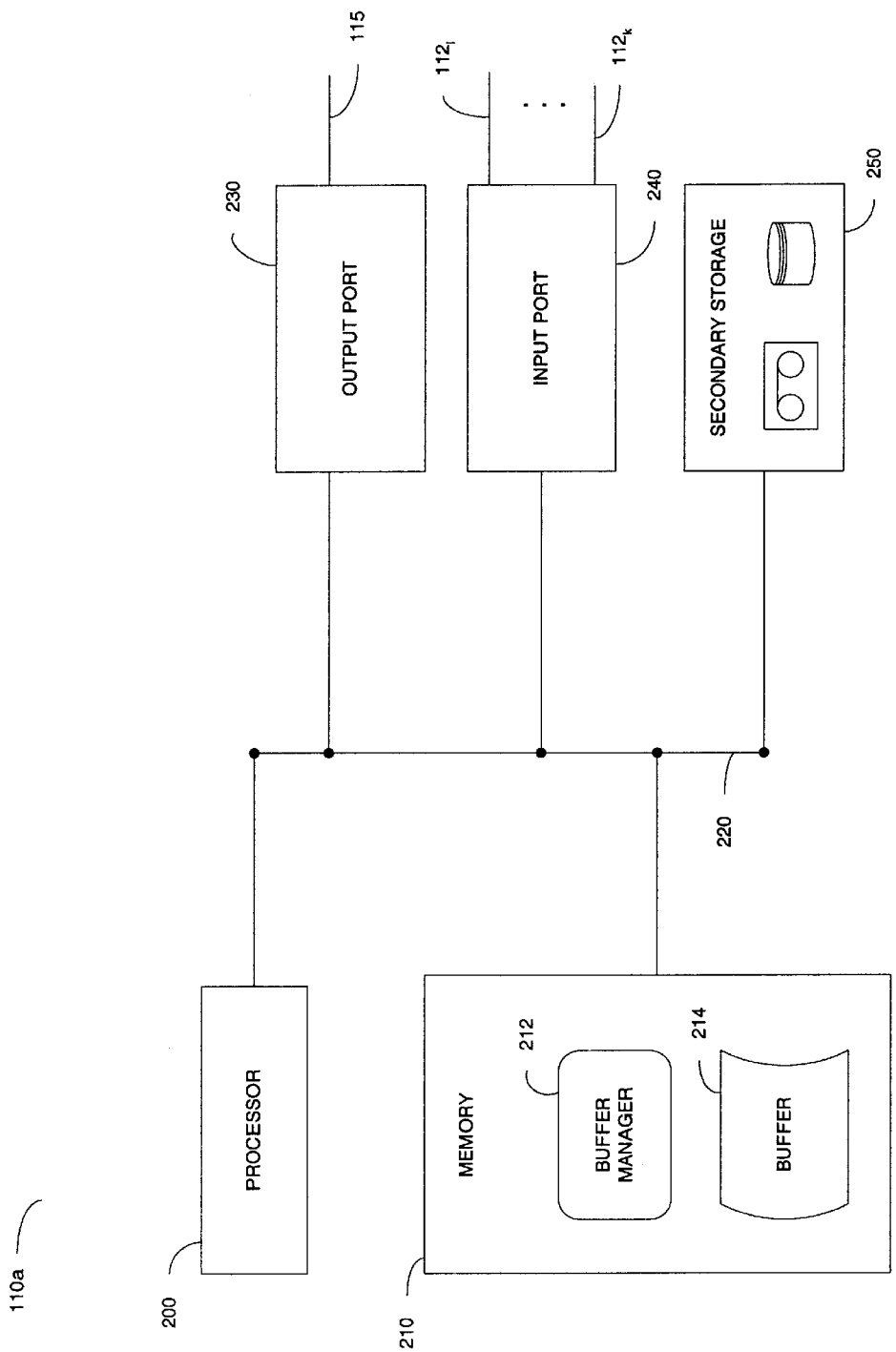
FIG. 2 is a block diagram of a node in a communications network in accordance with an embodiment of the invention.

FIG. 2 is a block diagram of node 110a in accordance with an embodiment of the invention. As shown, node 110a comprises processor 200 connected via bus 220 to memory 210, output port 230, and input port 240. Output port 230 interfaces with link 115. Input port 240 interfaces with links $112_l$–$112_k$.

Memory 210 includes buffer manager 212 and buffer 214. Buffer manager 212 includes instructions in the form of software for managing contents of buffer 214, which processor 200 executes. Alternatively, the functionalities of buffer manager 212 and buffer 214 may be implemented in hardware or as part of output port 230 in form of hardware or software. Buffer manager 212 processes the packets received by input port 240, and stores them in buffer 214 before they are transmitted via output port 230.

Secondary storage 250 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
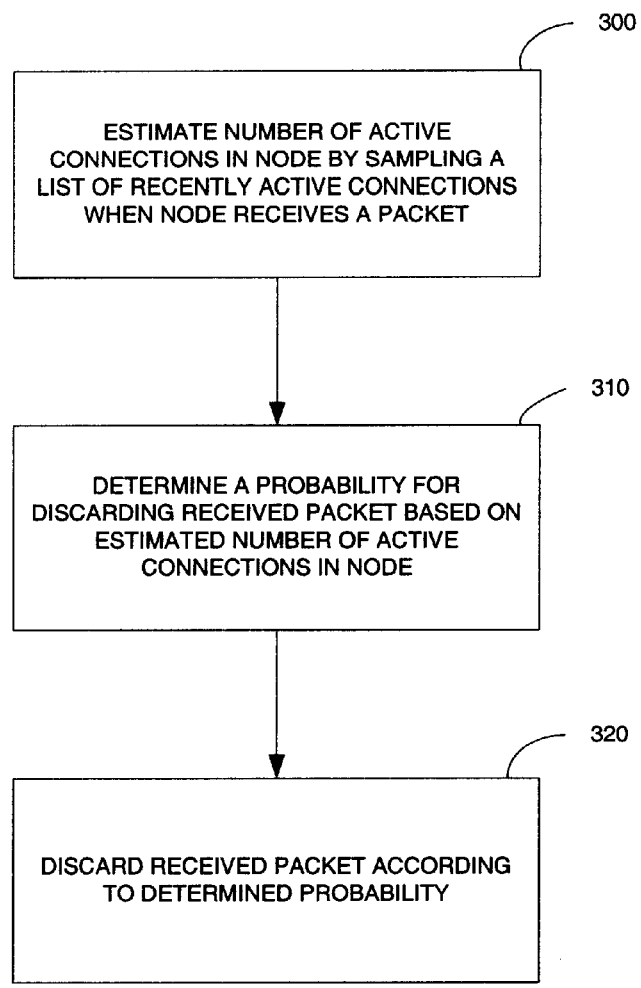
FIG. 3 is a flow chart of the steps performed by a node for stabilizing its buffer occupancy in accordance with an embodiment of the invention.

FIG. 3 is a flow chart of the steps performed by buffer manager 212 for stabilizing its buffer occupancy in accordance with an embodiment of the invention. When node 110a receives a packet via input port 240, buffer manager 212 estimates the number of active connections in node 110a by statistically sampling a list of recently active connections (step 300). For example, buffer manager 212 may randomly select an entry from the list, which includes M entries, for example M=1000, maintained in memory 210. Each entry corresponds to a recently active connection in node 110a, and includes a connection identifier field, a count field, and a time-stamp field.

Buffer manager 112 then determines a probability $P_{discard}$ for discarding the packet based on the estimated number of active connections in node 110a (step 310). In one embodiment, buffer manager 212 may determine $P_{discard}$, for example, as follows:

$$p_{discard} = p_{sred}(q) \times \min\left(1, \frac{1}{(256 \times P(t))^2}\right),$$

where q is occupancy of buffer 214 when a packet t arrives at node 110a, and 1/P(t) is an estimate of the number of active connections in node 100a. Buffer manager 212 may compute a flow factor P(t), for example, as follows:

$$P(t)=(1-\alpha)P(t-1)+\alpha H(t),$$

where $0<\alpha<1$ and H(t) indicates whether packet t is associated with the selected entry. H(t) may be represented as follows:

$$H(t) = \begin{cases} 1 & \text{if buffer manager determines a hit,} \\ 0 & \text{otherwise.} \end{cases}$$

Buffer manager 212 determines a hit when packet t is associated with the connection identifier in the selected entry. Buffer manager 212 may determine packet t is associated with the connection identifier when packet t is associated with the same origination address, origination port number, destination address, destination port number, and protocol identifier as the connection identifier. Alternatively, buffer manager 212 may determine packet t is associated with the connection identifier when packet t is associated with the same destination address as the connection identifier, regardless of their respective origination addresses. The specific method for determining whether packet t is associated with the connection identifier may, in part, be determined by the level of aggregation in connections.

Buffer manager 212 may compute $P_{sred}$ (q) for an occupancy q in buffer 214 as follows:

$$p_{sred}(q) = \begin{cases} p_{\max} & \text{if } \frac{1}{3}B \leq q < B, \\ \frac{1}{4}p_{\max} & \text{if } \frac{1}{6}B \leq q < \frac{1}{3}B, \\ 0 & \text{if } 0 \leq q < \frac{1}{6}B, \end{cases}$$

where B is the total capacity of buffer 214, and $P_{max}$ is a constant equal to, for example, 0.15.

In another embodiment, buffer manager 212 may determine $P_{discard}$ as follows:

$$p_{discard} = p_{sred}(q) \times \min\left(1, \frac{1}{(256 \times P(t))^2}\right) \times \left(1 + \frac{H(t)}{P(t)}\right).$$

Finally, buffer manager 212 determines whether to discard the packet according to the determined discarding probability, $P_{discard}$ (step 320). If buffer manager 212 does not discard the packet, it stores the packet in buffer 214 before transmitting the packet via output port 230.

Figure 4:
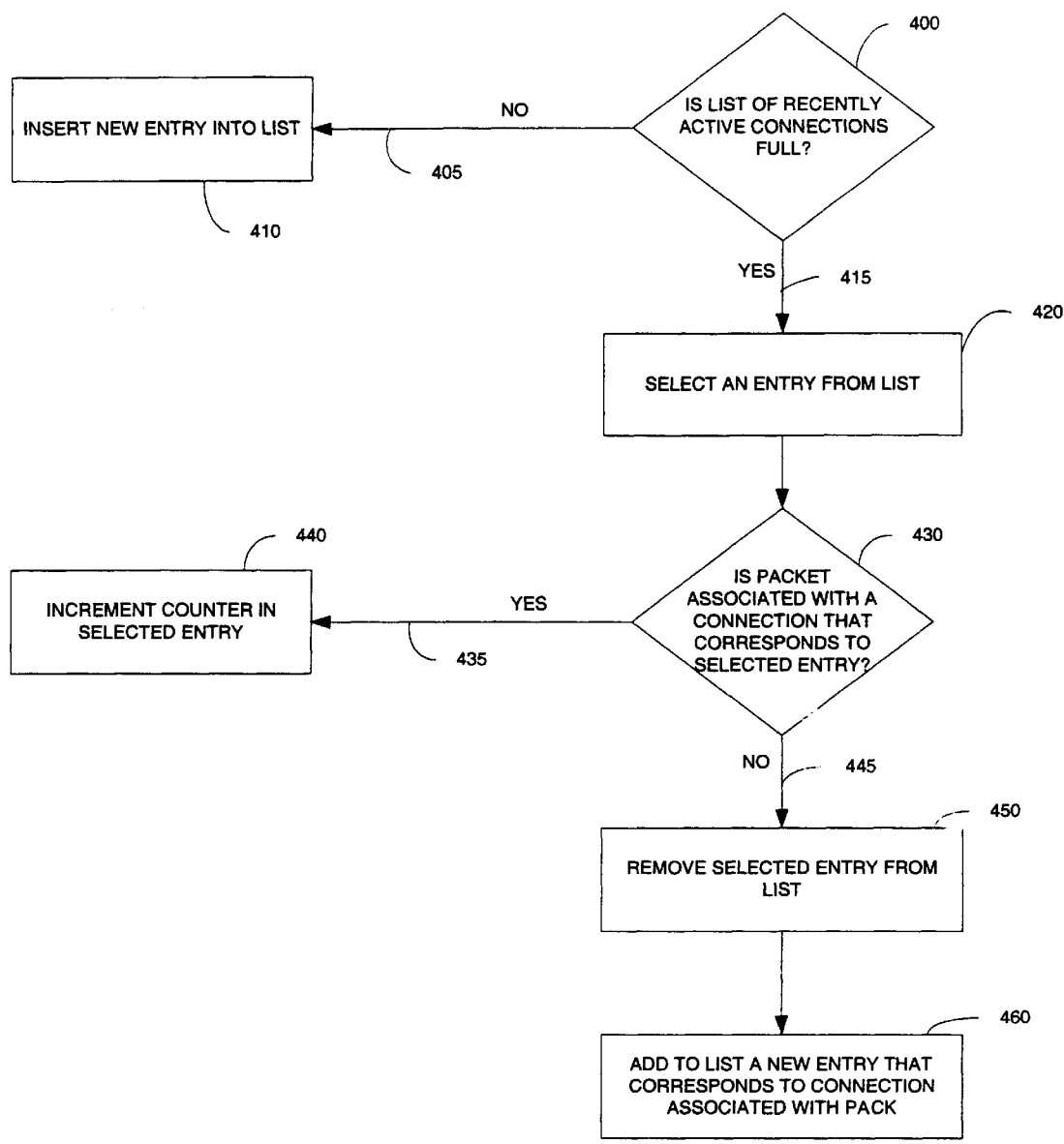
FIG. 4 is a flow chart of the steps performed by a node for estimating the number of active connections in the node in accordance with an embodiment of the invention.

FIG. 4 is a flow chart of the steps performed by buffer manager 212 for estimating the number of active connections in node 110a in accordance with an embodiment of the invention. When node 110a receives a packet via input port 240, buffer manager 212 determines whether the number of entries in the list of recently active connections is less than M (step 400). When the number of entries is less than M (step 405), buffer manager 212 inserts a new entry into the list (step 410) whose connection identifier is associated with the received packet. The connection identifier may include, for example, the origination address, origination port number, destination address, destination port number of the received packet, and protocol identifier. Buffer manager 212 then sets the count field to zero, and the time-stamp field to the arrival time of the packet.

When the number of entries equals M (step 415), buffer manager 212 selects an entry from the list (step 420). Buffer manager 212 then determines whether the received packet is associated with the connection identifier in the selected entry (step 430). When the received packet is associated with the connection identifier in the selected entry (step 435), buffer manager 212 increments the count in the selected entry (step 440).

When the received packet is not associated with the connection identifier in the selected entry (step 445), with probability $P_{entry}$, for example $P_{entry}=1/4$, buffer manager 212 removes the selected entry from the list (step 450). Buffer manager 212 then adds to the list a new entry whose connection identifier is associated with the received packet (step 460). The connection identifier may include, for example, the origination address, origination port number, destination address, destination port number of the received packet, and protocol identifier. Buffer manager 212 then sets the count field to zero, and the time-stamp field to the arrival time of the packet.

In accordance with an embodiment of the invention, when the buffer 214 occupancy q exceeds a first predetermined threshold and buffer manager 212 determines a hit for a packet associated with a connection in buffer 214, buffer manager 212 may monitor and collect certain state information associated with that connection. The state information may include, for example, the interval of time or a subset of the interval of time the connection is monitored, the number of packets that are associated with the connection and that arrive during the interval, and/or the arrival rate of packets associated with the connection.

Buffer manager 212 monitors the connection until it determines that the state information collected over a predetermined interval of time, for example the arrival rate of packets associated with the connection, is less than a second predetermined threshold. Accordingly, buffer manager 212 would monitor and maintain in memory 210 only, for example, the arrival rate of packets associated with the connection and only as long as the arrival rate collected over the predetermined interval of time is greater than or equal to the second predetermined threshold. When buffer manager 212 determines that the state information collected over the predetermined interval of time is less than the second predetermined threshold, buffer manager 212 terminates the monitoring and collection of state information associated with that connection.

In accordance with another embodiment, when buffer manager 212 determines that buffer 214 occupancy q exceeds a first predetermined threshold, determines a hit for an arriving packet associated with a connection, and after incrementing the count in the entry selected from the list of recently active connections determines that the count in the selected entry is greater than or equal to a second predetermined threshold K, buffer manager 212 may collect and monitor state information associated with that connection. For example, buffer manager 212 may monitor a connection when the fraction of arriving packets that are associated with the connection is greater than a predetermined probability π, for example a multiple of the flow factor P(t). A node administrator may set the predetermined threshold K for the count of each entry in the list of recently active connections, for example, such that:

$$\exp\{-M\pi^{K+1}\} = \frac{1}{2};$$

$$K+1 = \frac{\log(M) - \log(\log(2))}{|\log(\pi)|}.$$

When buffer manager 212 determines a hit for an arriving packet, buffer manager 212 may also determine a total occurrences of the connection associated with the packet. Buffer manager 212 determines the total occurrences by identifying all entries in the list that are associated with the connection. Buffer manager 212 then adds the (count +1) of each identified entry to determine the total occurrences. Buffer manager 212 monitors the connection when, for example, the total occurrence is $$\frac{M\pi}{1-\pi}.$$

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for managing buffers by determining a number of active connections in a node in a communications network, said method comprising the steps of:
    sampling a list of connection identifier entries when the node receives a packet, wherein the entries correspond to packets that have passed through the node; and
    estimating the number of active connections based on whether a connection of the received packet is associated with the connection identifier of the sampled entry.

2. The method of claim 1 further comprising the steps of:
    incrementing a count in the sampled entry when the connection of the received packet is associated with the connection identifier of the sampled entry; and
    modifying, based on a predetermined probability, the sampled entry to correspond to the connection of the received packet when this connection is not associated with the connection identifier of the sampled entry.

3. A method for stabilizing number of packets in a buffer of a node in a communications network, said method comprising the steps of:
    when the node receives a packet, estimating the number of active connections in the node by sampling a list of connections that correspond to packets that have passed through the node;
    determining a probability for discarding the received packet based on the estimated number of active connections; and
    discarding the received packet according to the determined probability.

4. The method of claim 3, wherein each entry from the list of connections includes a connection identifier and a count, said method further comprising the steps of:
    incrementing the count of the sampled entry when a connection of the received packet is associated with the connection identifier of the sampled entry; and
    modifying, based on a predetermined probability, the sampled entry to correspond to the connection of the received packet when this connection is not associated with the connection identifier of the sampled entry.

5. The method of claim 4 further comprising the steps of:
    monitoring the connection of the received packet when this connection is associated with the connection identifier of the sampled entry and the count exceeds a first predetermined threshold.

6. The method of claim 4 further comprising the steps of:
    monitoring the connection of the received packet when this connection is associated with the connection identifier of the sampled entry and a total occurrences of the connection identifier in the list exceeds a second predetermined threshold.

7. A computer-readable medium capable of configuring a node in a communications network to perform a method for managing buffers by determining the number of active connections in the node, said method comprising the steps of:
    sampling a list of connection identifier entries when the node receives a packet, wherein the entries correspond to packets that have passed through the node; and
    estimating the number of active connections based on whether a connection of the received packet is associated with the connection identifier of the sampled entry.

8. A computer-readable medium capable of configuring a node in a communications network to perform a method for stabilizing a number of packets in a buffer of the node, said method comprising the steps of:
    when the node receives a packet, estimating the number of active connections in the node by sampling a list of connections that correspond to packets that have passed through the node;
    determining a probability for discarding the received packet based on the estimated number of active connections; and
    discarding the received packet according to the determined probability.

9. A node in a communications network, comprising:
    a buffer manager, responsive to a received packet, for sampling one or more entries from a list of connection identifiers that correspond to packets that have passed through the node, and for estimating the number of active connections in the node based on whether a connection of the received packet is associated with any of the sampled entries.

10. A node in a communications network, comprising:
    a buffer manager, responsive to a received packet, for estimating the number of active connections in the node by sampling a list of connections that correspond to packets that have passed through the node, for determining a probability for discarding the received packet based on the estimated number of active connections, and for discarding the received packet according to the determined probability.

11. A method for controlling buffer congestion in a node, said method comprising the steps of:
    when the node receives a packet, comparing a connection associated with the received packet to a connection identifier sampled from a list wherein the list is created as packets pass through the node;

estimating a number of active connections based on whether the connection corresponding to the received packet is associated with the sampled connection identifier;

based on the estimated number of active connections, determining a probability for discarding the received packet; and controlling buffer congestion by discarding the packet according to the determined probability.

12. The method of claim 11, wherein the step of determining the probability is also based on buffer occupancy.

13. The method of claim 12, wherein the step of determining the probability is further based on whether the connection corresponding to the received packet is associated with the sampled connection identifier.

14. The method of claim 11 further comprising steps for maintaining the list including:

incrementing a count associated with the sampled connection identifier when the received connection is associated with sampled connection identifier; and modifying, based on a predetermined probability, the list entry of the sampled connection identifier to correspond to the received connection when the received connection is not associated with the sampled connection identifier.

* * * * *